US011129448B1

(12) United States Patent
Cretikos

(10) Patent No.: US 11,129,448 B1
(45) Date of Patent: Sep. 28, 2021

(54) TIE-DOWN DEVICE

(71) Applicant: Dimitri Cretikos, Laguna Hills, CA (US)

(72) Inventor: Dimitri Cretikos, Laguna Hills, CA (US)

(*) Notice: Subject to any disclaimer, the term of this patent is extended or adjusted under 35 U.S.C. 154(b) by 0 days.

(21) Appl. No.: 17/000,085

(22) Filed: Aug. 21, 2020

(51) Int. Cl.
*A44B 11/12* (2006.01)
*B60P 7/08* (2006.01)
*B60P 7/135* (2006.01)

(52) U.S. Cl.
CPC ............ *A44B 11/12* (2013.01); *B60P 7/0823* (2013.01); *B60P 7/135* (2013.01); *Y10T 24/3416* (2015.01); *Y10T 24/3449* (2015.01)

(58) Field of Classification Search
CPC ........ A44B 11/125; A44B 11/12; B60P 7/135; B60P 7/0823; Y10T 24/4074; Y10T 24/4755; Y10T 24/3416; Y10T 24/342; Y10T 24/3449; Y10T 24/3417
See application file for complete search history.

(56) References Cited

U.S. PATENT DOCUMENTS

| | | | |
|---|---|---|---|
| 4,567,628 A * | 2/1986 | Prete, Jr. ............... | A44B 11/14 24/170 |
| 5,423,644 A | 6/1995 | First, Sr. | |
| 7,926,151 B1 | 4/2011 | MacWilliam | |
| 8,387,217 B1 * | 3/2013 | Hinds ............... | A63B 69/0057 24/265 H |
| 9,254,778 B2 * | 2/2016 | Gangakhedkar ........ | F16B 45/02 |
| 9,266,462 B2 | 2/2016 | Miller | |
| 9,521,880 B2 | 12/2016 | Nealon | |
| 9,592,059 B2 | 3/2017 | Fry | |
| 9,835,407 B2 | 12/2017 | McLean | |
| 2009/0007315 A1 | 1/2009 | Karon | |

* cited by examiner

*Primary Examiner* — Robert Sandy
(74) *Attorney, Agent, or Firm* — Raymond Sun

(57) ABSTRACT

A tie-down device for securing a load to another object has a buckle assembly that includes an outer housing having two parallel side walls, a bridge, and first and second end walls connected to the side walls. A pivoting member extends through the side walls. The buckle assembly further includes a cam-shaped locking button which is located on the pivoting member and is normally biased by a biasing member into a locked position, the locking button having a central bore formed therethrough and receiving the pivoting member. A row of serrated teeth is provided on the locking button and is biased downwardly by the biasing member into substantial engagement with the second end wall. A hook extends from the first end wall and has a bar that defines a space with the first end wall. The hook is provided in the same piece and same material as the outer housing.

4 Claims, 5 Drawing Sheets

TIE-DOWN DEVICE

BACKGROUND OF THE INVENTION

1. Field of the Invention

The present invention relates to an adjustable tie down device for use in providing a convenient and adjustable connection in securing a load or object to another object during storage or transport.

2. Description of the Prior Art

Tie-down devices that include tie-down straps and cam hooks have been provided for tying down or securing all sorts of loads or objects, ranging from smaller objects such as backpacks, gear bags, coolers, tool bags, and tents, to larger objects such as bicycles and motorcycles.

Most of these conventional devices have to meet a number of different requirements that vary and depend on the size of the cam hook used with the device. As a result, these devices are usually comprised of numerous straps, buckles and other components.

Currently, when a cam buckle is used, the cam buckle needs to be secured or sewn to one place on an object, and then connected to a strap or webbing before being able to be tied down. This can be inconvenient for use with tying down certain objects.

Thus, there remains a need for a simple tie down device that is simple in construction, and overcomes the drawbacks in the conventional devices described above.

SUMMARY OF THE DISCLOSURE

In order to accomplish the objects of the present invention, there is provided a tie-down device for securing a load to another object, the tie-down device having a buckle assembly. The buckle assembly includes an outer housing having parallel first and second side walls, a bridge, and first and second end walls connected to the side walls, and an opening defined by the second end wall, the bridge and the side walls. A pivoting member extends through the first and second side walls, and a biasing member is carried on the pivoting member. The buckle assembly further includes a cam-shaped locking button which is located on the pivoting member and is normally biased by the biasing member into a locked position, the locking button having a central bore formed therethrough and receiving the pivoting member. A row of serrated teeth is provided on the locking button on a projecting surface thereof, the serrated teeth biased downwardly by the biasing member into substantial engagement with the second end wall. A hook has a neck extending from the first end wall and a bar so that a space is defined between the bar and the first end wall, wherein the hook is provided in the same piece and same material as the outer housing.

DETAILED DESCRIPTION OF THE PREFERRED EMBODIMENTS

Figure 1:
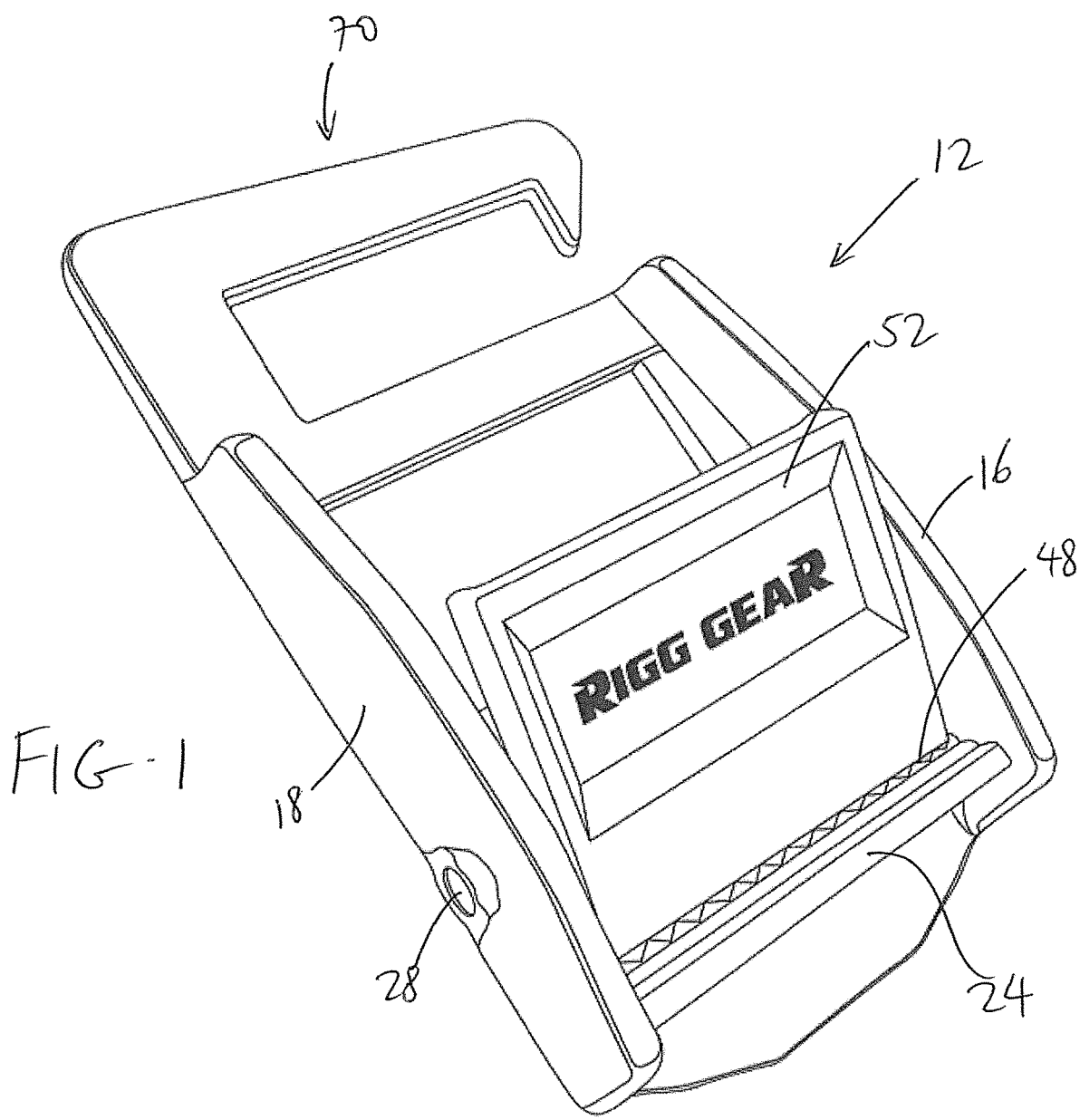
FIG. 1 is a perspective view illustrating a tie-down device of the present invention.

The following detailed description is of the best presently contemplated modes of carrying out the invention. This description is not to be taken in a limiting sense, but is made merely for the purpose of illustrating general principles of embodiments of the invention. The scope of the invention is best defined by the appended claims.

Referring to the drawings, the present invention provides a tie-down device for securing a load (shown in phantom) to another object (also shown in phantom), or for use in other appropriate situations. As will be described herein in more detail, the tie-down device provides a mechanical advantage which enables the tie-down device to be used to securely fasten the load to the object.

The tie-down device primarily includes a buckle assembly 12 that has a plastic, steel or aluminum outer housing 14 having parallel side walls 16, 18, interconnected by a bottom plate or bridge 20, and two end walls 22 and 24. Two openings 20a and 20b are defined on either side of the bridge 20, with the opening 20a bordered by the end wall 22, the bridge 20 and the side walls 18 and 20, and with the opening 20b bordered by the end wall 24, the bridge 20 and the side walls 18 and 20. A round aperture 26 and 28 is also formed in each side wall 16 and 18, respectively, over the opening 20b, with the opposing apertures 26 and 28 being designed to receive a pivoting member 30, i.e., a steel bar, rod, pin, rivet or roller. The pivoting member 30 is inserted through opposing apertures 26 and 28, and includes a head 32 at one end, and a bolt or nut (not shown) received or formed at the other end for securing the pivoting member 30 between the two side walls 16 and 18.

Instead of the opening 20a, a solid plate can be provided in the space defined by the opening 20a.

A quick-release locking mechanism or catch can be assembled integrally with the buckle 12. The locking mechanism preferably includes a cam-shaped locking button 40, which is located on the pivoting member 30 and is normally biased by a spring 42 into an engaged or locked position. The spring 42 can be carried on the pivoting member 30. The locking button 40 includes a central bore 44 formed therethrough which is designed to receive and enable pivotal movement of the button on pivoting member 30. The locking button 40 further includes rows of serrated teeth 48 on the bottom, projecting surface thereof, which are biased downwardly by spring 42 into substantial engagement with the end wall 24. The end wall 24 can have a slanted or angled surface 50 that is aligned to contact the row of serrated teeth 48 to support a webbing or strap 60 (see FIG. 2) thereon for engagement by the serrated teeth 48.

Figure 2:
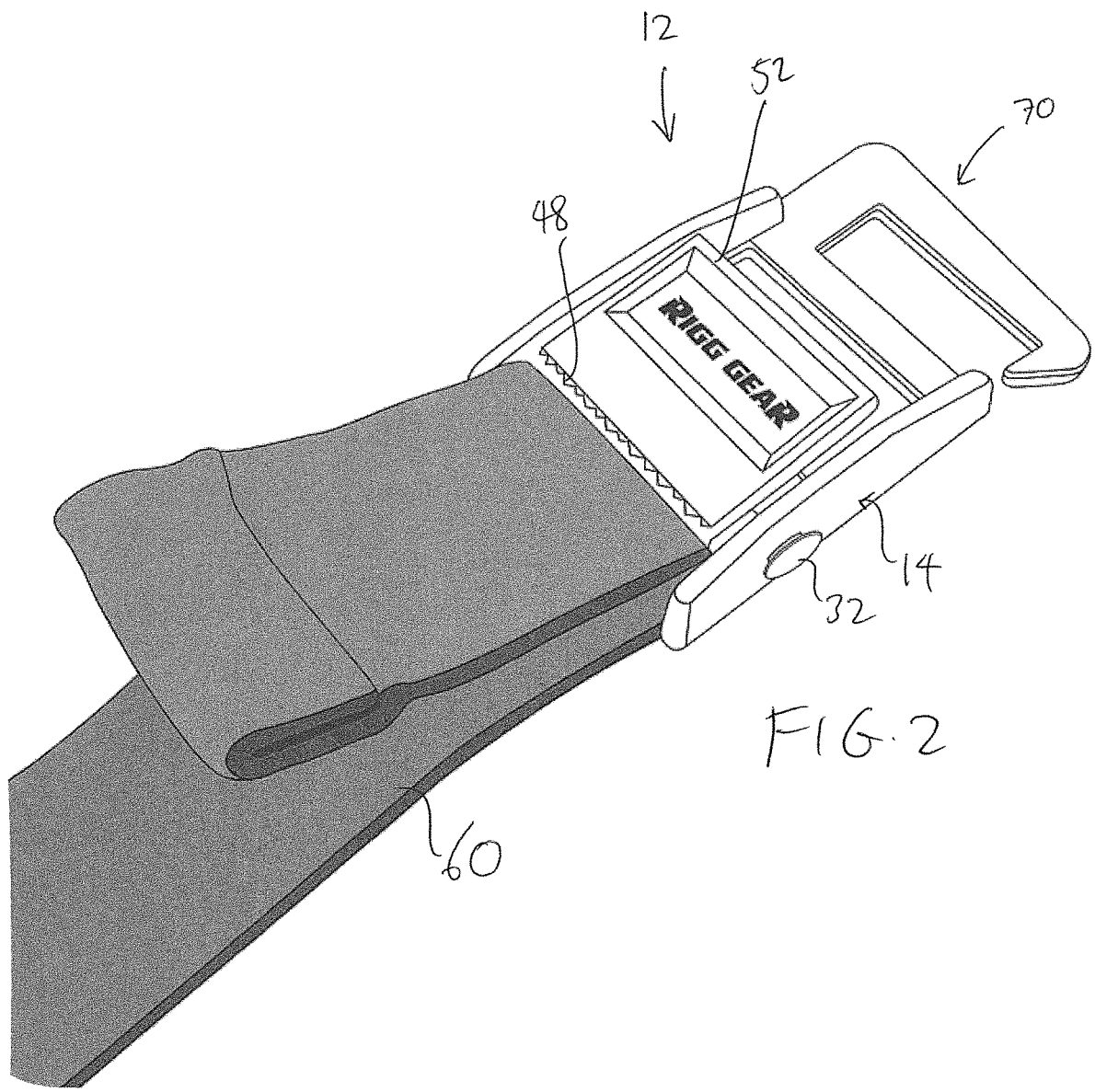
FIG. 2 is a perspective view of the tie-down device of FIG. 1 shown in use with an adjusting strap.
Figure 3:
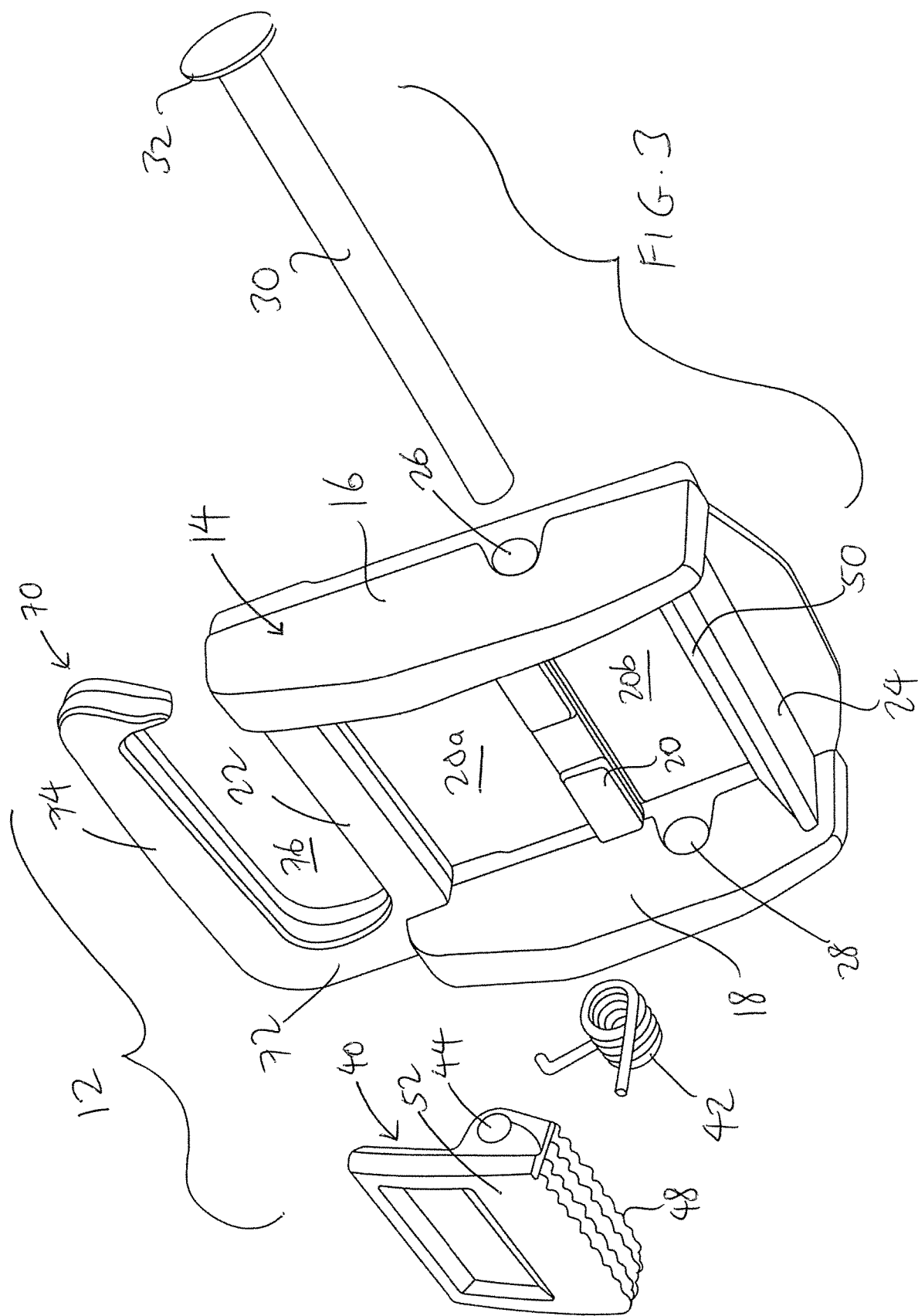
FIG. 3 is an exploded perspective view of the tie-down device of FIG. 1.

As best shown in FIG. 2, the strap 60 extends around the end wall 24 and through the opening 20b. When the strap 60 is located between the serrated teeth 48 and the angled surface 50 of the outer housing 14, the serrated teeth 48 engage the strap 60, the locking button 40 is pivoted downwardly against the strap 60, which prevents relative movement of the strap 60 in the reverse direction (i.e., in a direction which would release the strap 60). An outwardly-extending release button or flange 52 on the locking button 14 can be manually manipulated by the user (i.e., pressed down into the outer housing 14) to pivot the cam-shaped locking button 40 against its spring bias out of engagement with the strap 60 to release the strap 60 and allow movement thereof.

A hook 70 extends directly from the end wall 22. The hook 70 has a neck 72 and a bar 74 so that a space 76 is defined between the bar 74 and the end wall 22. The hook 70 is preferably made in the same piece and same material as the outer housing 14. The hook 70 can be formed from 8 mm plated steel and can be dipped or covered with a layer of rubber to prevent damage to the object being hooked or secured.

Figure 4:
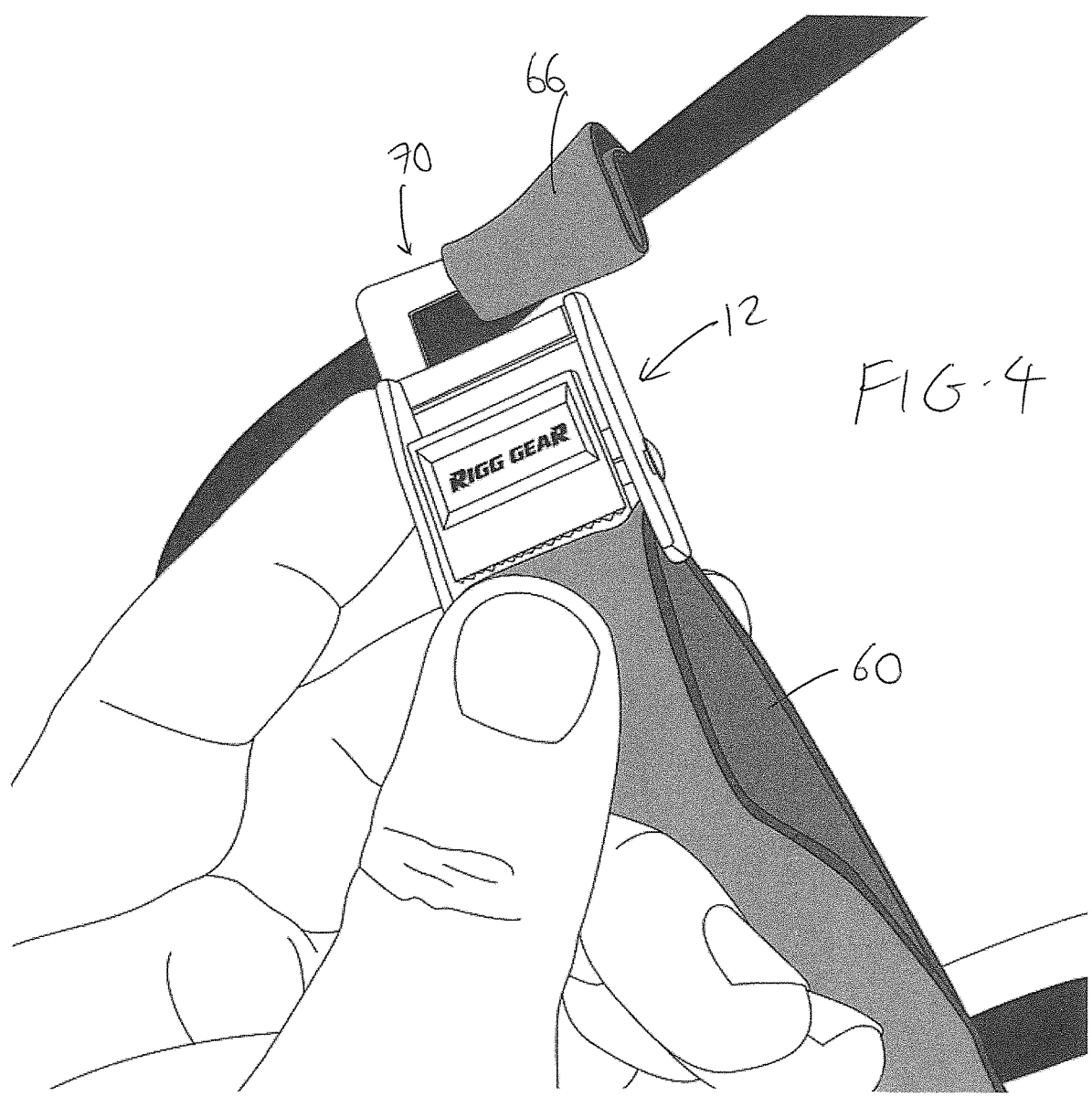
FIG. 4 illustrates how the hook of the tie-down device of FIG. 1 is used with a loop on an object.

FIG. 4 shows the buckle assembly 12 in use with the hook 70 inserted through a securing loop 66 that is part of an object that can be anything having a fixed loop to connect with the hook 70 to secure a bag, backpack, tail bag, saddlebag, or gearbag to a vehicle. The hook 70 allows the buckle assembly 12 to secure to the securing loop 66 of any object, and then the strap 60 can be adjusted at the buckle assembly 12. This provides a simple and effective adjustable connection.

Figure 5:
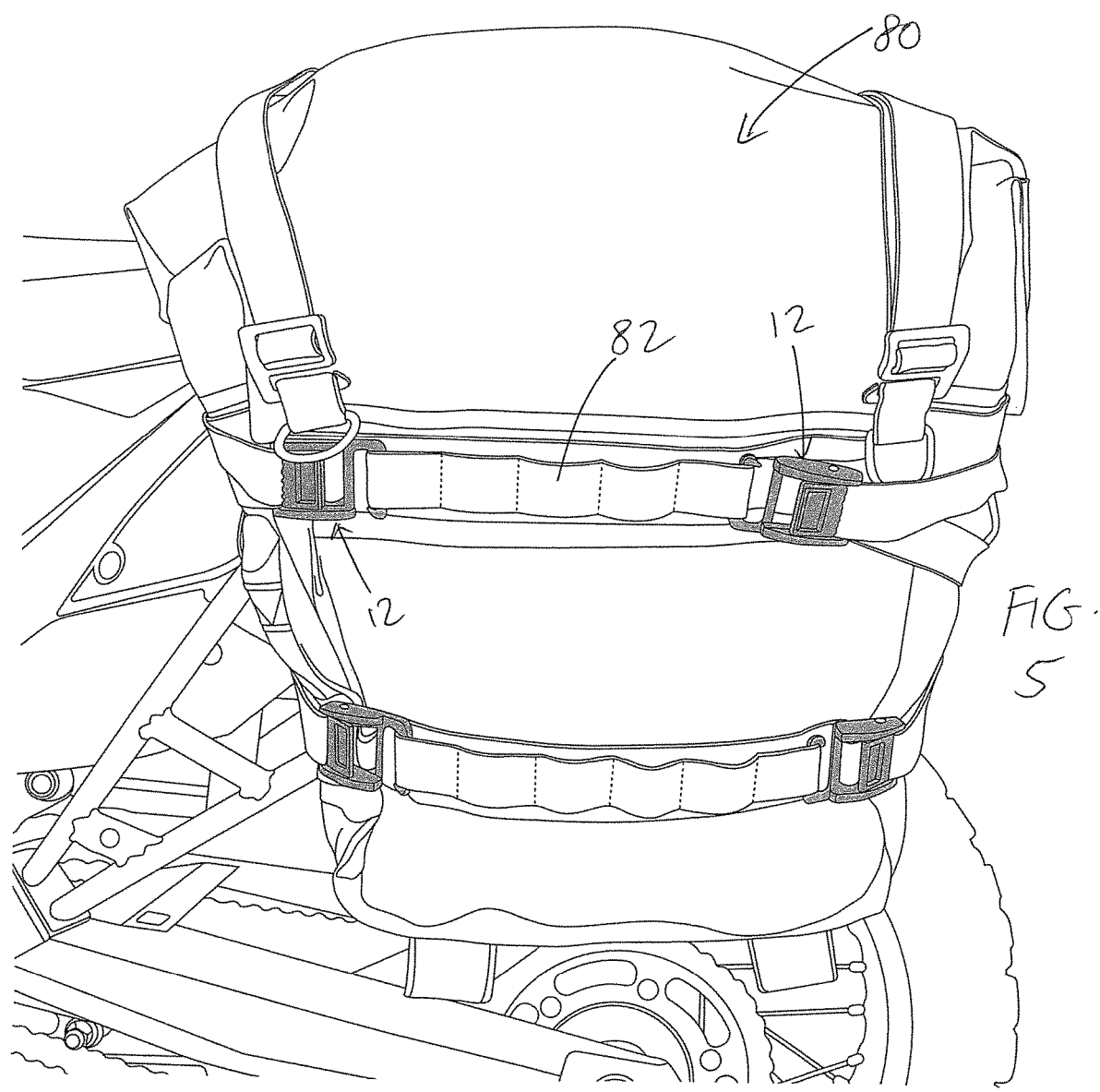
FIG. 5 illustrates how the tie-down device of FIG. 1 can be used to secure a saddlebag to a rack that is attached to a vehicle.

FIG. 5 shows a plurality of attachment points (i.e., defined by each buckle assembly 12) in use in securing a motorcycle saddlebag 80 to a rack which is part of a vehicle. In this embodiment, the hooks 70 of two buckle assemblies 12 connect opposite ends of a connecting strap 82. Once the hook 70 is connected to a loop 66 or MOLLE (Modular Lightweight Load-carrying Equipment) system, by pulling on the strap 60, the strap 60 passes over the lower portion of the buckle 50, and once in place, the release button 40 locks the strap 60 in place using the serrated teeth 48 to prevent the strap 60 from sliding loose. A tighter clamp is achieved by greater pressure.

The term "strap" as used herein is intended to encompass other (typically) flat strips or webbing of flexible material, such as bands, belts, thongs, ties, cords (elastic or non-elastic), tethers, chains, etc. Other strap-like devices can also be used with the present invention as should also be apparent to those skilled in the art. In short, the term "strap" is intended to encompass all such alternative embodiments useful with the present invention.

The buckle construction described above is simple and easy to manufacture, is generally resistant to dirt, fluids and other elements, and provides consistent operating results over its useful life. For existing tie-down devices, when a cam buckle is used, the cam buckle needs to be secured or sewn to one place on an object then connected to a strap or webbing before being able to be tied down. With the present invention, the cam buckle can now be attached anywhere where there are loops 60 or MOLLE mounting points on the items being secured, thereby allowing for complete adjustability on locations to accomplish the tie-down. In addition, the quick-release button 52 allows the tie-down device of the present invention to be easily removable from the item being secured without having to remove the webbing or the strap, as the current cam buckles would require.

While the description above refers to particular embodiments of the present invention, it will be understood that many modifications may be made without departing from the spirit thereof. The accompanying claims are intended to cover such modifications as would fall within the true scope and spirit of the present invention.

What is claimed is:

1. A tie-down device for securing a load to another object, comprising a buckle assembly having:
   an outer housing having parallel first and second side walls, a bridge that has opposite ends connected to the first and second side walls, and first and second end walls, each end wall having opposite ends connected to the first and second side walls;
   an opening defined by the second end wall, the bridge and the first and second side walls;
   a pivoting member extending through the first and second side walls;
   a biasing member carried on the pivoting member;
   a cam-shaped locking button which is located on the pivoting member and is normally biased by the biasing member into a locked position, the locking button having a central bore formed therethrough and receiving the pivoting member, the locking button further including at least one row of serrated teeth on a projecting surface thereof, which are biased downwardly by the biasing member into substantial engagement with the second end wall; and
   a hook having a neck extending from the first end wall and a bar so that a space is defined between the bar and the first end wall, wherein the hook is provided in the same piece and same material of the outer housing.

2. The device of claim 1, wherein the second end wall has an angled surface that is aligned to contact the at least one row of serrated teeth.

3. The device of claim 2, wherein a round aperture is formed in each side wall, with the pivoting member extending through each round aperture.

4. The device of claim 2, further including a strap extending around the second end wall and through the opening, with the serrated teeth engaging the strap at the location of the angled surface.

\* \* \* \* \*